United States Patent [19]

Fujii et al.

[11] 4,320,791

[45] Mar. 23, 1982

[54] PNEUMATIC TIRE BEAD COMPRISING HIGH MODULUS FIBERS AND POLYURETHANE MATRIX

[75] Inventors: Katsuhiko Fujii, Niiza; Minoru Ueda, Osaka; Hiroshi Minekawa, Sennan, all of Japan

[73] Assignees: Honda Giken Kogyo Kabushiki Kaisha, Tokyo; The Ohtsu Tire & Rubber Co., Ltd., Osaka, both of Japan

[21] Appl. No.: 184,306

[22] Filed: Sep. 5, 1980

[30] Foreign Application Priority Data

Sep. 12, 1979 [JP] Japan ................... 54-117753

[51] Int. Cl.$^3$ ............... B60C 15/04; B29H 17/32
[52] U.S. Cl. ................. 152/362 R; 57/241; 57/258; 57/902; 156/136
[58] Field of Search .......... 152/362 R, 362 CS, 391; 57/201, 902, 241, 258, 232, 242, 250, 251; 156/136

[56] References Cited

U.S. PATENT DOCUMENTS 3,237,674  3/1966  Budd et al. ................ 156/136
3,787,224  1/1974  Uffner ...................... 428/268
3,942,574  3/1976  Bantz ....................... 152/362 R
4,075,048  2/1978  Lupton et al. .............. 152/362 R
4,098,316  7/1978  Carvalho et al. ............ 152/362 R

FOREIGN PATENT DOCUMENTS 50-82705  7/1975  Japan.

*Primary Examiner*—Edward C. Kimlin
*Assistant Examiner*—Lois E. Boland
*Attorney, Agent, or Firm*—Armstrong, Nikaido, Marmelstein & Kubovcik

[57] ABSTRACT

A pneumatic tire including bead members each comprising a slender bead element made of an organic or inorganic fiber other than metallic material and having a high modulus of at least $10^5$ kg/cm$^2$, and a matrix phase made from a liquid thermosetting resin or liquid rubber cured before the bead member is incorporated into the tire to form a composite body together with the fiber. The matrix phase has a modulus of 50 to $10^6$ kg/cm$^2$ after curing. The cured composite body of the bead element and the matrix phase has a stress of at least 200 kg when stretched 1%. The volume fraction of the bead element relative to the bead member is 0.2 to 0.8.

3 Claims, 9 Drawing Figures

PNEUMATIC TIRE BEAD COMPRISING HIGH MODULUS FIBERS AND POLYURETHANE MATRIX

BACKGROUND OF THE INVENTION

The present invention relates to an improvement in bead members for use in pneumatic tires for reducing the weight and fuel cost of vehicles.

With arguments focused on limitations on petroleum supplies in recent years, efficient use of derivatives of petroleum is now at issue. For savings of energy, the problem of fuel cost has attracted much attention in the automotive industry. For the reduction of fuel cost, aerodynamic improvements in the vehicle construction, as well as improved engine efficiencies, are most desirable, and it is also desired to reduce the weight of the vehicle and that of the tire as a component thereof.

In place of steel wires conventionally used as bead members in tires, it has been proposed to use so-called aramid cords which are composed only of a lightweight organic fiber having a high modulus. However, aramid cords have poor stability and are extremely difficult to handle for the production of tires. To solve this problem, U.S. Pat. No. 3,942,574 discloses a tire bead comprising aramid cords and a metal cord disposed alongside the aramid cords for stabilizing the aramid cords and rigidifying the bead. Although having increased rigidity and made easier to handle during the molding of tires, the bead still remains to be improved for the reduction of its weight since it has incorporated therein the metal cord. Additionally the conjoint use of aramid and metal cords involves the drawback of rendering the bead structure complex.

SUMMARY OF THE INVENTION

An object of the present invention is to provide a pneumatic tire having light and durable bead members which comprise a slender bead element prepared from an organic or inorganic high-modulus fiber other than metallic material and a matrix phase prepared from a liquid thermosetting resin or liquid rubber by curing.

Another object of the invention is to provide a pneumatic tire having bead members which is very easily fittable to the rims of wheels.

Another object of the invention is to provide a pneumatic tire having bead members each comprising a matrix phase made from a liquid thermosetting resin or liquid rubber which is cured before the bead member is used for the fabrication of the tire, so that the bead member retains its annular shape and can be used easily on conventional tire building machines.

DETAILED DESCRIPTION OF THE INVENTION

Figure 1:
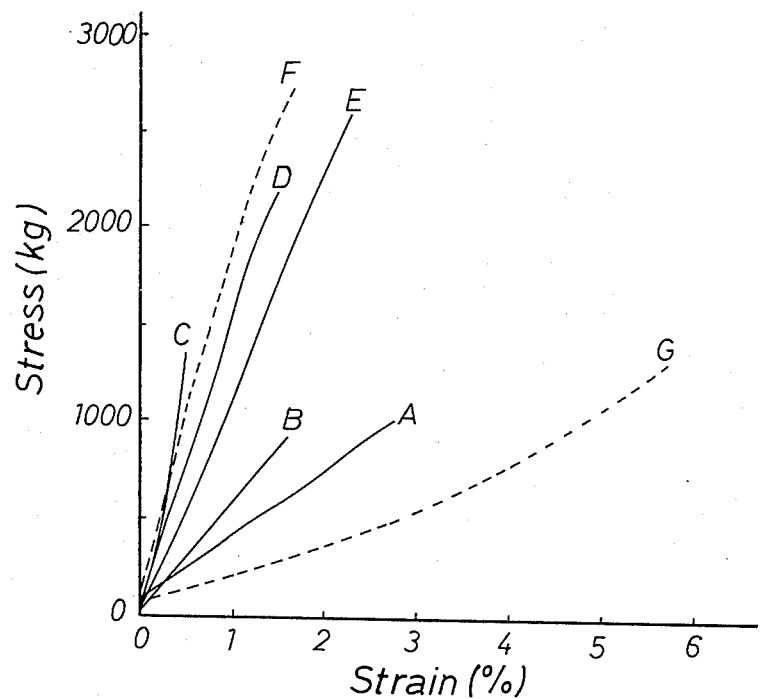
FIG. 1 is a graph showing the stress-strain characteristics of the bead members of examples of this invention and the bead members prepared for comparison.

The present invention provides a pneumatic tire comprising as a structural component thereof a bead member comprising a slender bead element made of an organic or inorganic fiber other than metallic material and having a high modulus of at least $10^5$ kg/cm$^2$, and a matrix phase made from a liquid thermosetting resin or liquid rubber cured before the bead member is incorporated into the tire to form a composite body together with the fiber, the matrix phase having a modulus of 50 to $10^6$ kg/cm$^2$ after curing, the cured composite body of the bead element and the matrix phase having a stress of at least 200 kg when stretched 1%, the volume fraction of the bead element in the composite body being 0.2 to 0.8 relative to the composite body. The tire has a smaller weight than, and is as durable as, pneumatic tires having conventional steel wires as bead members.

The present invention will be described below in greater detail.

We have found that as substitutes for conventional steel wires, high-modulus organic fibers, such as aramid fiber, and high-modulus inorganic fibers, such as carbon fiber, are fully useful for slender bead elements or cords having high specific strength and high specific modulus. We have further found that the use of such materials makes it possible to provide flexible pneumatic tires having bead members which retain the desired rigidity and strength under operating conditions and which are very easily fittable to the rims of wheels. In addition to being lightweight and easily fittable to the rim, the tire of this invention exhibits improved performance, for example, in cornering and steering control and renders the vehicle comfortable to ride in.

As a substitute for steel wires, aramid fiber is preferable in view of its specific strength. Examples of other useful materials for the slender bead element are polyester fiber, carbon fiber, glass fiber, and other fibers in the form of whiskers which have high rigidity and a modulus of at least $10^5$ kg/cm$^2$. It is critical that the bead member be capable of withstanding the inflation pressure to be involved in the fabrication of tires. The modulus, strength and ultimate elongation of the bead member before the bead member is incorporated into the tire are also critical. Especially the bead member must have a small elongation when subjected to the inflation pressure during the fabrication of the tire. Useful bead elements for assuring reduced elongation are cords without any twist or having a small twist number; those having a large twist number are not desirable. Fibers for forming bead elements having the desired specific strength and specific modulus can be in the form of filaments or short fibers.

The finer the component filaments or fibers, the higher is the strength of the bead element. With use of too thick filaments or fibers, the bead member will have an exceedingly high modulus under compression and will not be smoothly fittable to existing rims. However, the bead member is then fittable to a split rim or other special rims.

The matrix phase, another essential component of the bead member of this invention, will be described.

Figure 2:
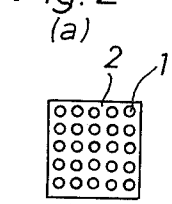
FIGS. 2(a), (b), (c) and 3 (d), (e) show bead members in cross section.
Figure 2:
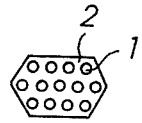
Figure 2:
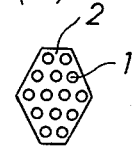
Figure 3:
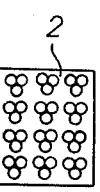
Figure 3:
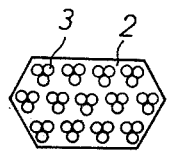

FIGS. 2(a), (b) and (c) show in cross section bead structures each comprising a conventional steel wire 1 and a matrix phase 2 for adhering the wire portions together and enabling the bead to retain its shape with stability. To provide bead members having a reduced weight and enhanced strength according to this invention, the cross sections shown in FIG. 3(d) and (e) are also useful as well as those shown in FIGS. 2(a) to (c). The bead members of this invention need not always have a specific shape. In FIGS. 3(d) and (e), indicated at 2 is a matrix and at 3 a bead element of the invention.

The matrix phase is prepared from a material which is liquid at room temperature, is capable of fully adhering to the bead element and has a modulus of 50 to $10^6$ kg/cm$^2$ when cured. With use of materials less than 50 kg/cm$^2$ in modulus after curing, the bead member is unable to retain its shape satisfactorily and is not suited to the fabrication of tires, whereas if the modulus exceeds $10^6$ kg/cm$^2$, the bead member is not smoothly fittable to the rim. Examples of useful materials for the matrix phase are liquid resins, such as polyetherpolyurethane, polyesterpolyurethane, epoxy resin, etc., and liquid rubbers, such as liquid styrene-butadiene copolymer, liquid polybutadiene, liquid acrylonitrile-butadiene copolymer, etc.

Of these materials, liquid polyurethane resins are most preferable, because the matrix phase, before and after curing, can then be adapted to have the desired properties with greater freedom and because such resins can be cured to a hardened body having good shape retentivity and is capable of easily adhering to the bead element and to other tire components adjoining the bead member.

Briefly stated, the bead member of this invention is prepared, for example, by the following method (which, however, is not illustrated).

A cord serving as the slender bead element is paid off from a reel and passed through a container containing a liquid polyurethane resin or the like to impregnate or coat the cord. The time taken for the cord to pass through the resin container must be varied in accordance with the viscosity of the resin; it is retained in the resin for a longer period of time at a higher viscosity or for a shorter period at a lower viscosity. If the resin is applied to the cord to excess, the excess of the resin may be removed from the cord by squeezing the cord with rubber rolls or by passing the cord through a small hole. The impregnated or coated cord is then wound around a mold, conforming to the shape of the bead member, a required number of turns so that the resulting assembly will have the desired tensile strength calculated with the safety factor of the tire considered.

The resin applied to the cord is then cured to form a matrix phase. The curing conditions, which are determined suitably depending on the kind of the resin used, are preferably 120° C. and about 2 hours when polyurethane resins are used. With use of different additives or the like, the resin can be cured within a shorter period of time.

After the matrix phase has been cured, the bead member is removed from the mold for use in the fabrication of tires. To render the bead member releasable from the mold, the mold must be of the segmented type.

Thus the matrix phase is cured to form a composite body together with the bead element, namely the bead member. The bead member of this invention must have a stress of at least 200 kg when stretched 1%. With such a stress less than 200 kg, the bead member, when used for molding tires on a usual tire building machine, is unable to withstand the inflation pressure, failing to afford a tire.

According to the invention, the volume fraction of the bead element relative to the composite body, namely the bead member, is preferably 0.2 to 0.8. Further as will be apparent from the cross sectional structures of bead members shown in FIGS. 2 and 3, portions of the bead element or bead elements are preferably arranged as uniformly distributed in the matrix phase. If the volume fraction of the bead element relative to the bead member is less than 0.2, the bead member has low tensile strength, in which case the bead member must have an increased cross sectional area to assure the safety of the tire. This, however, is in conflict with the contemplated objects of the invention in view of the weight and performance of the tire and the rim-tire fitness. When the volume fraction exceeds 0.8, the adhesion of the matrix phase to the bead element is low (with a lesser amount of matrix present), so that the resulting bead member is unable to retain its annular shape effectively. Additionally the frictional contact of the bead element with itself will reduce the strength of the bead element.

The usefulness of this invention will be described with reference to the following example.

EXAMPLE

Aramid cords and glass cords were used as bead elements to prepare bead member specimens, which were tested for stress-strain characteristics. The results are shown in Table 1 and FIG. 1.

TABLE 1

| Bead member | Material | | Volume fraction of bead element | Structure of bead member | Stress (kg) | |
|---|---|---|---|---|---|---|
| | Bead element | Matrix | | | At break | When stretched 1% |
| Invention | | | | | | |
| A | Glass cord*1 | Polyurethane*5 | 0.53 | FIG. 3(d) | 1020 | 410 |
| B | Aramid cord*2 | Polyurethane*5 | 0.21 | FIG. 3(d) | 925 | 575 |
| C | Aramid cord*2 | Polyurethane*5 | 0.32 | FIG. 3(d) | 1355 | — |
| D | Aramid cord*2 | Polyurethane*5 | 0.43 | FIG. 3(d) | 2200 | 1525 |
| E | Aramid cord*2 | Polyurethane*5 | 0.48 | FIG. 3(d) | 2700 | 1125 |
| Comparison | | | | | | |
| F | Steel wire*3 | Rubber | 0.65 | FIG. 2(b) | 2690 | 1875 |
| G | Aramid cord*4 | Polyure- | 0.32 | FIG. 3(d) | 1375 | 198 |

TABLE 1-continued

| Bead member | Material | | Volume fraction of bead element | Structure of bead member | Stress (kg) | |
|---|---|---|---|---|---|---|
| | Bead element | Matrix | | | At break | When stretched 1% |
| | | thane*[5] | | | | |

Note:
*[1]H15 3/0 cord.
*[2]1500-denier untwisted cord.
*[3]1.2 mm in diameter.
*[4]1500 D/3 cord (S twist 34.5 TPI, Z twist 34.5 TPI).
*[5]Polyoxytetramethyleneglycol polyurethane.

In Table 1, the volume fraction of the bead element is the fraction of the volume of the bead element based on the total of the volume of the bead element and that of the matrix phase.

FIG. 1 is a graph showing the stress-strain characteristics of the bead members, in which the strain (elongation, %) is plotted as abscissa vs. the stress (kg) as ordinate.

With use of the bead members having the characteristics given in Table 1, tire specimens were prepared which were tested for static properties. Table 2 shows the results. The specimens were of 165SR13 size and steel-belted radial construction.

With use of the aramid cord (specimen G in Table 1) having a large twist number, it was impossible to fabricate a tire by the conventional method since the bead member was unable to withstand the inflation pressure applied for fabrication. This indicates that the composite body of the bead element and the matrix phase, namely the bead member, must have a stress of at least 200 kg when stretched 1%. Table 1 and FIG. 1 reveal that the bead members having an untwisted cord have a greatly increased stress when stretched 1% even when the volume fraction of the bead element relative to the bead member is low.

TABLE 2

| | | Static Properties of Tires* | | | | | | |
|---|---|---|---|---|---|---|---|---|
| Tire No. | Bead member used | Tire | | | Spring constant (kg/mm) | | Bead unseating | Rim-tire fitness |
| | | O.D. (mm) | Width (mm) | Weight (kg) | Vertical | Lateral | | |
| Invention | | | | | | | | |
| 1 | A | 595 | 169 | 7.35 | 16.1 | 6.6 | 512 | Excellent |
| 2 | B | 597 | 169 | 7.35 | 16.0 | 6.6 | 603 | Excellent |
| 3 | C | 595 | 168 | 7.35 | 16.0 | 6.9 | 820 | Excellent |
| 4 | D | 596 | 169 | 7.35 | 16.5 | 7.3 | 1100 | Excellent |
| 5 | E | 597 | 168 | 7.3 | 16.8 | 7.6 | 1111 | Excellent |
| Comparison | | | | | | | | |
| 1 | F | 596 | 169 | 7.6 | 16.7 | 7.5 | 1025 | Usual |
| 2 | G | — | — | — | — | — | — | — |

Note:
*According to JIS D 4230.

Table 2 shows that the weights of the tires of the invention, even with some variation, are at least about 200 g (about 2.5%) smaller than the weight of the comparison tire and that the invention provides greatly improved rim-tire fitness. It is also seen that the use of the bead members of the invention produces no adverse effect on dimensions of the tire, such as outside diameter (O.D.) and width.

Table 3 below shows that the tire 5 of the invention is comparable to the tire 1 of comparison in endurance.

TABLE 3

| | Endurance of Tires*[1] | |
|---|---|---|
| | Tire 5 of invention | Comparison tire 1 |
| DOT endurance*[2] | Acceptable | Acceptable |
| DOT high speed performance | Acceptable (115 miles/hr-15 min) | Acceptable (110 miles/hr-10 min) |

*[1]According to Federal Motor Vehicle Safety Standard (FMVSS) 119.
*[2]"DOT" stands for Department of Transportation.

The result of a J-turn test is listed in Table 4, which shows that the tire of the invention has proved satisfactory.

TABLE 4

| | Performance of Tires on Vehicle | |
|---|---|---|
| | Tire 5 of invention | Comparison tire 1 |
| J-turn test*[1] | 1.0*[2] | 0.9*[2] |

*[1]Vehicle: HONDA ACCORD
Wheel: 5-J × 13
Course: J-shaped course with a turn of 10 m in radius.
Speed of entrance into the turn: 45 km/hr.
*[2]The inflation pressure of the tire at which the tire disengaged from the rim when the tire pressure was progressively lowered during testing under the above conditions.

Figure 4:
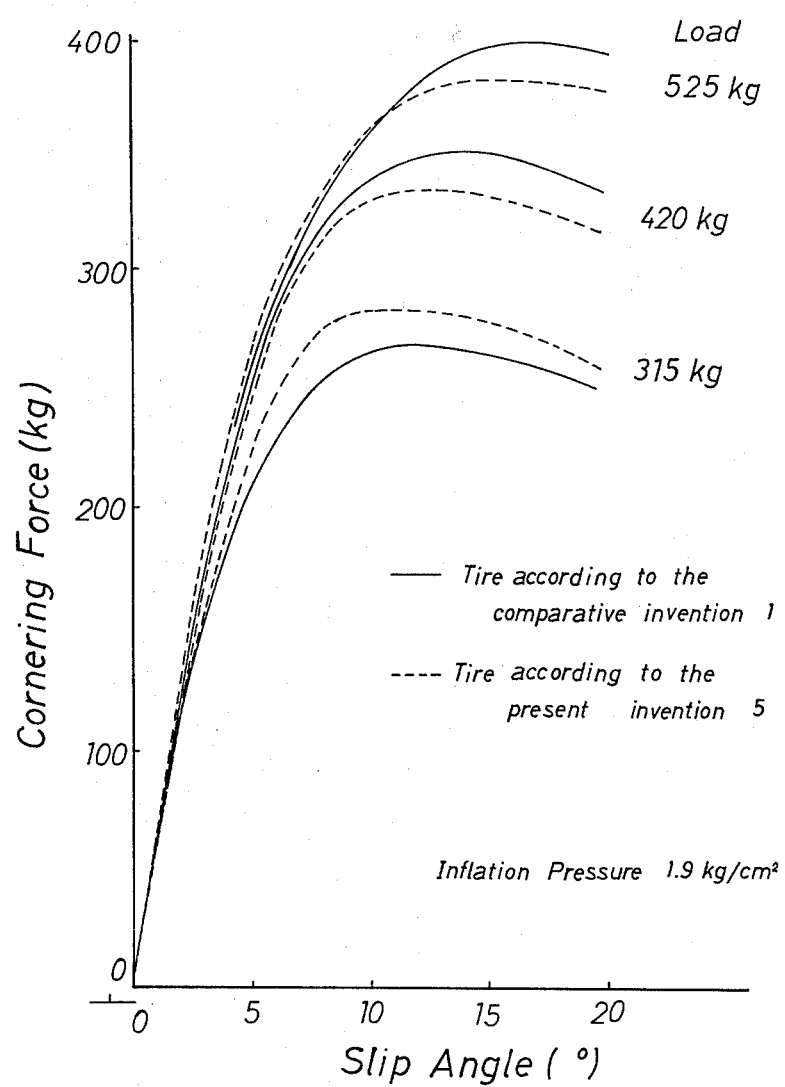
FIGS. 4 to 6 show the performance of a tire of this invention and that of a conventional tire for comparison.
Figure 5:
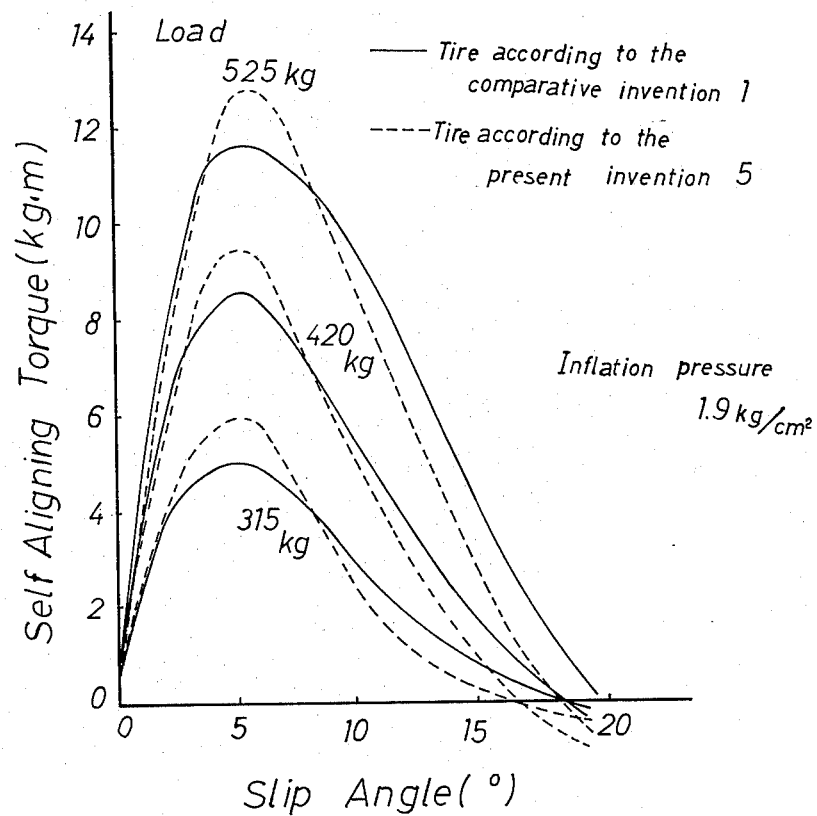
Figure 6:
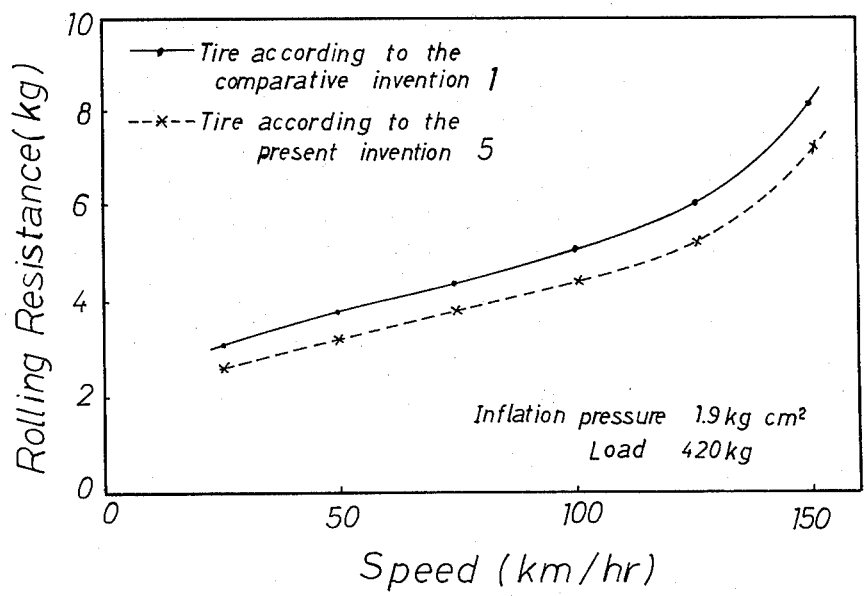

FIGS. 4 and 5 show the cornering and steering performance of the above-mentioned tires. It is seen that the tire of the invention has achieved good results. FIG. 6 showing the rolling resistance of the tires indicates that the tire of the invention has improved rolling resistance over the entire speed range.

The volume fraction of the slender bead element relative to the bead member, although up to 53% in the case of the bead members used in the foregoing example of the invention, can be increased by winding the bead element more ingeniously. Bead members of sufficient strength can then be provided with a reduced volume.

As described above, the present invention provides a bead member comprising a slender bead element made of an aramid fiber or like organic fiber, or glass fiber or like inorganic fiber having a high modulus of at least $10^5$ kg/cm$^2$, and a matrix phase made from a liquid thermosetting resin or liquid rubber and having a modulus of 50 to $10^6$ kg/cm$^2$ after curing, the bead member having a stress of at least 200 kg when stretched 1%, the volume fraction of the bead element relative to the bead member being 0.2 to 0.8. As compared with conventional bead members comprising a steel wire, or an aramid cord and a metal cord disposed alongside the aramid cord, the bead member of this invention, when used as a structural element of the tire, provides tires having a greatly reduced weight, assuring reduced fuel consumption and easily fittable to the rim, without impairing other properties of the tires. Thus the bead member is well suited for savings of energy.

Since the matrix phase of the bead member is made from a liquid thermosetting resin or liquid rubber which is cured before the bead member is used for the fabrication of tires, the bead member has the advantage of retaining its annular shape and therefore being easily usable on conventional tire building machines.

What is claimed is:

1. A pneumatic tire including as a component thereof a bead member comprising a slender bead element in the form of an untwisted cord made solely of an organic fiber having a high modulus of at least $10^5$ kg/cm$^2$, and a matrix phase made from a liquid thermosetting polyurethane resin cured before the bead member is incorporated into the tire to form a composite body together with the fiber, the matrix phase having a modulus of 50 to $10^6$ kg/cm$^2$ after curing, the cured composite body of the bead element and the matrix phase having a stress of at least 200 kg when stretched 1%, the volume fraction of the bead element in the composite body being 0.2 to 0.8 relative to the composite body.

2. A pneumatic tire as defined in claim 1 wherein the organic fiber is selected from among aramid fiber and polyester fiber.

3. A pneumatic tire as defined in claim 1 wherein the thermosetting polyurethane resin for forming the matrix phase is liquid at room temperature and is selected from either a polyether polyurethane resin or a polyesterpolyurethane resin.

* * * * *